United States Patent [19]
Swisher et al.

[11] Patent Number: 5,484,656
[45] Date of Patent: Jan. 16, 1996

[54] CHEMICAL TREATMENT FOR FIBERS AND REINFORCEMENT FOR POLYMER MATRICES RESULTING IN GOOD SOLVENT RESISTANCE

[75] Inventors: Robert G. Swisher; Peter C. Gaa, both of Pittsburgh; James W. Kasunic, Sarver, all of Pa.

[73] Assignee: PPG Industries, Inc., Pittsburgh, Pa.

[21] Appl. No.: 7,407

[22] Filed: Jan. 22, 1993

Related U.S. Application Data

[63] Continuation of Ser. No. 215,190, Jul. 5, 1988, abandoned.
[51] Int. Cl.$^6$ ................................... D02G 3/00
[52] U.S. Cl. .................. 428/378; 428/375; 428/391; 428/392; 428/404; 524/494
[58] Field of Search ................. 428/391, 392, 428/378, 375, 402; 528/45, 288; 525/424, 101, 123, 124; 524/832, 812, 839, 801, 494

[56] References Cited

U.S. PATENT DOCUMENTS 2,946,762  7/1960  Kocay ..................... 524/421

(List continued on next page.)

FOREIGN PATENT DOCUMENTS

| 0356655 | 3/1990 | European Pat. Off. . |
| 2004676 | 8/1991 | Germany ............. 524/832 |
| 57-022144 | 2/1982 | Japan . |
| 58-079069 | 5/1983 | Japan . |
| 58-021837 | 11/1983 | Japan . |
| 958390 | 5/1964 | United Kingdom . |
| 1087162 | 10/1967 | United Kingdom . |

OTHER PUBLICATIONS

Product Sheet for Roplex Acrylic Emulsions.
Article entitled "Blocked Isocyantes in Coatings", J. W. Rosthauser and J. L. Williams, Mobay Chemical Corporation (now Miles), Pittsburgh, Pennsylvania.
Product bulletin entitled *Experimental Emulsion E–693* from Rohm & Haas Company.
"Coordinating Compounds", Kirk–Othmer Encyclopedia of Chemical Technology, vol. 6, 1965, pp. 122–130.
Product bulletin entitled "*Rucothane Polyurethane Latexes*" from Ruco Division of Hooker Chemical Corporation (now Ruco Polymer Company).
Product bulletin entitled "*Baybond XW–116*" from Mobay Corporation.
Product brochure entitled "*Plastics Additives, Cyanox®711 Antioxidant*", from Cyanamid, Polymer Products Division, Wayne, New Jersey.
Product bulletin entitled *Experimental Emulsion E–693* from Rohm & Haas Company.
Product bulletin from Ruco Division of Hooker Chemical Corp. (now Ruco Polymer Company).

*Primary Examiner*—Patrick J. Ryan
*Assistant Examiner*—Jill M. Gray
*Attorney, Agent, or Firm*—Kenneth J. Stachel

[57] ABSTRACT

Fibrous material including fibers, bundles of fibers, strands, roving, flakes and beads have a dried residue of a chemical treating composition for improved solvent resistance of polymers the fibrous materials reinforced. The chemical treated composition has at least one crosslinkable polyurethane, at least one organofunctional silane coupling agent, and acrylic copolymer with at least one addition polymerizable acrylic-type monomer and at least one monomer that is addition polymerizable and matrix resin miscible and reactable and a carrier. In addition, the chemical treating composition can have a polyurethane crosslinking agent in an effective amount to produce a dried residue of limited swellability from the chemical treatment, where the residue is a thin film on a substantial portion of the surface of the fibrous materials. Optionally, there may be present at least one low temperature antioxidant such as alkali metal and alkaline earth metal hypo or hydrogen phosphites. Also, there may be present in addition or in lieu of the first antioxidant a high temperature antioxidant such as: alkali metal or alkaline earth metal phenylphosphonates, thioethers like dialkyl thioalkylionate and processing aids such as epoxy polyester polymers.

38 Claims, 2 Drawing Sheets

U.S. PATENT DOCUMENTS

| Patent # | Date | Name | Class |
|---|---|---|---|
| 2,960,486 | 11/1960 | Pye | 524/421 |
| 3,018,262 | 1/1962 | Schroeder | 523/402 |
| 3,108,990 | 10/1963 | Baxter | 524/419 |
| 3,157,562 | 11/1964 | Kine et al. | 161/170 |
| 3,298,995 | 1/1967 | Bloor et al. | 524/239 |
| 3,352,816 | 11/1967 | Meyer et al. | 524/419 |
| 3,414,532 | 12/1968 | Hecker | 524/239 |
| 3,535,249 | 10/1970 | Larson | 524/418 |
| 3,565,840 | 2/1971 | Mirabile et al. | 524/421 |
| 3,655,828 | 11/1972 | Rushton | 524/239 |
| 3,860,558 | 1/1975 | Klemchuk | 260/45.8 N |
| 3,901,848 | 8/1975 | DiBattista et al. | 260/45.8 N |
| 3,933,737 | 1/1976 | Glander et al. | 524/191 |
| 4,009,317 | 2/1977 | Chase et al. | 428/378 |
| 4,043,976 | 8/1977 | Yoshikawo et al. | 524/191 |
| 4,052,362 | 10/1977 | Yoshikawo et al. | 524/191 |
| 4,054,695 | 10/1977 | Johnson | 427/390 D |
| 4,137,209 | 1/1979 | Wong et al. | 260/29.6 NR |
| 4,168,345 | 9/1979 | de Massey et al. | 428/392 |
| 4,200,707 | 4/1980 | Richardson | 525/2 |
| 4,238,575 | 12/1980 | Kleiner et al. | 525/212 |
| 4,246,145 | 1/1981 | Molinier | 65/3.44 |
| 4,252,852 | 2/1981 | Goth | 428/336 |
| 4,271,229 | 6/1981 | Temple | 428/392 |
| 4,272,294 | 6/1981 | Jaunarajs | 428/392 |
| 4,291,095 | 9/1981 | Chase et al. | 428/391 |
| 4,338,234 | 7/1982 | Moore et al. | 428/392 |
| 4,341,677 | 7/1982 | Tamosaukas | 523/421 |
| 4,382,991 | 5/1983 | Pollman | 428/392 |
| 4,408,005 | 10/1983 | Byrne | 524/421 |
| 4,423,199 | 12/1983 | Chang | 526/307.6 |
| 4,450,197 | 5/1984 | Hager et al. | 428/232 |
| 4,483,948 | 11/1984 | Tamosaukas | 523/205 |
| 4,503,175 | 3/1985 | Houze et al. | 525/123 |
| 4,507,342 | 3/1985 | Kielbania | 428/90 |
| 4,551,382 | 11/1985 | Gagne et al. | 428/258 |
| 4,581,405 | 4/1986 | Martischius et al. | 524/239 |
| 4,608,304 | 8/1986 | Rosthauser | 428/378 |
| 4,636,437 | 1/1987 | Algrim et al. | 428/391 |
| 4,778,854 | 10/1988 | Blum et al. | 525/123 |
| 4,863,989 | 9/1989 | Obayashi et al. | 524/421 |
| 4,888,383 | 12/1989 | Huybrechts | 524/832 |
| 5,130,198 | 7/1992 | Swisher et al. | 428/391 |
| 5,247,004 | 9/1993 | Swisher et al. | 524/494 |

CHEMICAL TREATMENT FOR FIBERS AND REINFORCEMENT FOR POLYMER MATRICES RESULTING IN GOOD SOLVENT RESISTANCE

This application is a continuation of application Ser. No. 07/215,190, filed Jul. 5, 1988 now abandoned.

The present invention is directed to a chemical treating composition for fibers, bundles of fibers, strands and roving and in general any shape of reinforcement material for polymers and the resulting chemically treated material. The chemically treated material is useful in forming reinforced polymers or plastics having little, if any, decrease in solvent resistance as a result of the presence of any fibers or reinforcement.

Polymer reinforcement is a major use of many fibrous materials by the FRP (fiber reinforced plastics) industry. Glass fibers are a type of reinforcement for polymers in FRP. Typically, the production of glass fibers entails formation of a plurality of fibers from molten streams of glass at speeds up to around 15,000 feet per minute. The glass fibers require protection from intrafilament abrasion during their production and improved compatibility between their hydrophilic, smooth inorganic surface and the oleophilic organic polymers and resins that they reinforce. The use of chemical treatments applied to the fibers during their formation has provided some of this protection and compatibility. Typically, the chemical treatments are aqueous solutions, emulsions, dispersions, foams, or gels having film forming polymers, coupling or keying agents, lubricants and possibly emulsifiers, wetting agents or processing aids.

The expansion of applications of reinforced polymers has resulted in a desire to produce reinforced polymer parts for use in environments of both inorganic and organic solvents. For instance, reinforced polymeric parts find increasing utilization in the automotive industry in such applications as containers for various automotive fluids; for example, oil pans and radiator parts that encapsulate the core of the radiator. The fibers and reinforcement which are used in reinforced polymers contacting organic fluids and/or solvents in various applications, should not decrease to any great extent the solvent resistance of the matrix polymer.

It is an object of the present invention to provide a chemical treatment for fibers and reinforcement for use in reinforced polymers that do not substantially detract from the solvent resistance of the matrix polymer.

It is a further additional object to provide chemically treated fibers and reinforcement for use with matrix polymers to provide good solvent resistance of a reinforced matrix polymer part while maintaining good initial strength properties of the reinforced polymer.

SUMMARY OF THE INVENTION

The aforementioned objects and other objects gleaned from this disclosure come to fruition from the chemical treating composition and chemically treated fibers and reinforcement of the present invention. This composition and the treated fibers and reinforcement have at least one crosslinkable polyurethane film forming polymer, at least one organofunctional silane coupling agent and/or hydrolysis products thereof, a copolymer formed by addition polymerization from an acrylic-type monomer and at least one monomer that is matrix-resin miscible and matrix-resin-reactable, and a carrier in an effective amount for applying the chemical treating composition to the fibers or reinforcement. The crosslinkable polyurethane film forming polymer and the copolymer can be present in the treating composition as oil-and-water emulsions or dispersions or solutions. The amount of the polyurethane film forming polymer is an effective film forming amount. The amount of the copolymer can range from a minor amount compared to that of the polyurethane film former to a 1 to 1 ratio with the polyurethane or even to a major amount of the non-carrier components of the treating composition. In addition the treating composition can have a fiber lubricant such as a cationic, nonionic lubricant and/or an epoxy polyester processing aid in effective lubricating or processing amounts. Also, the chemical treating composition can have water-dispersible, blocked di- or polyisocyanates in effective amounts to crosslink the polyurethane polymer to provide a dried residue of the chemical treating composition with reduced solvent swellability compared to an uncrosslinked dried residue. In addition, one or more antioxidants may be present in the chemical treating composition. Another additional optional component for the chemical treating composition is a metal deactivating agent such as those having the formula:

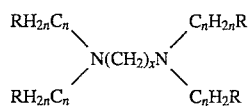

wherein 'x' is an integer with a value from 1 to about 6 and 'n' is an integer with a value from 1 to about 6 and 'R' is a carboxyl or hydroxyl group or the salts, ethers or esters thereof, and/or polydentate ligands.

The chemical treating composition is applied to the fibers and/or reinforcement in a manner and in an amount to provide at least a thin discontinuous coating on the surface of the fibers and reinforcement when a substantial portion of the carrier is removed.

DETAILED DESCRIPTION OF THE INVENTION

Figure 1:
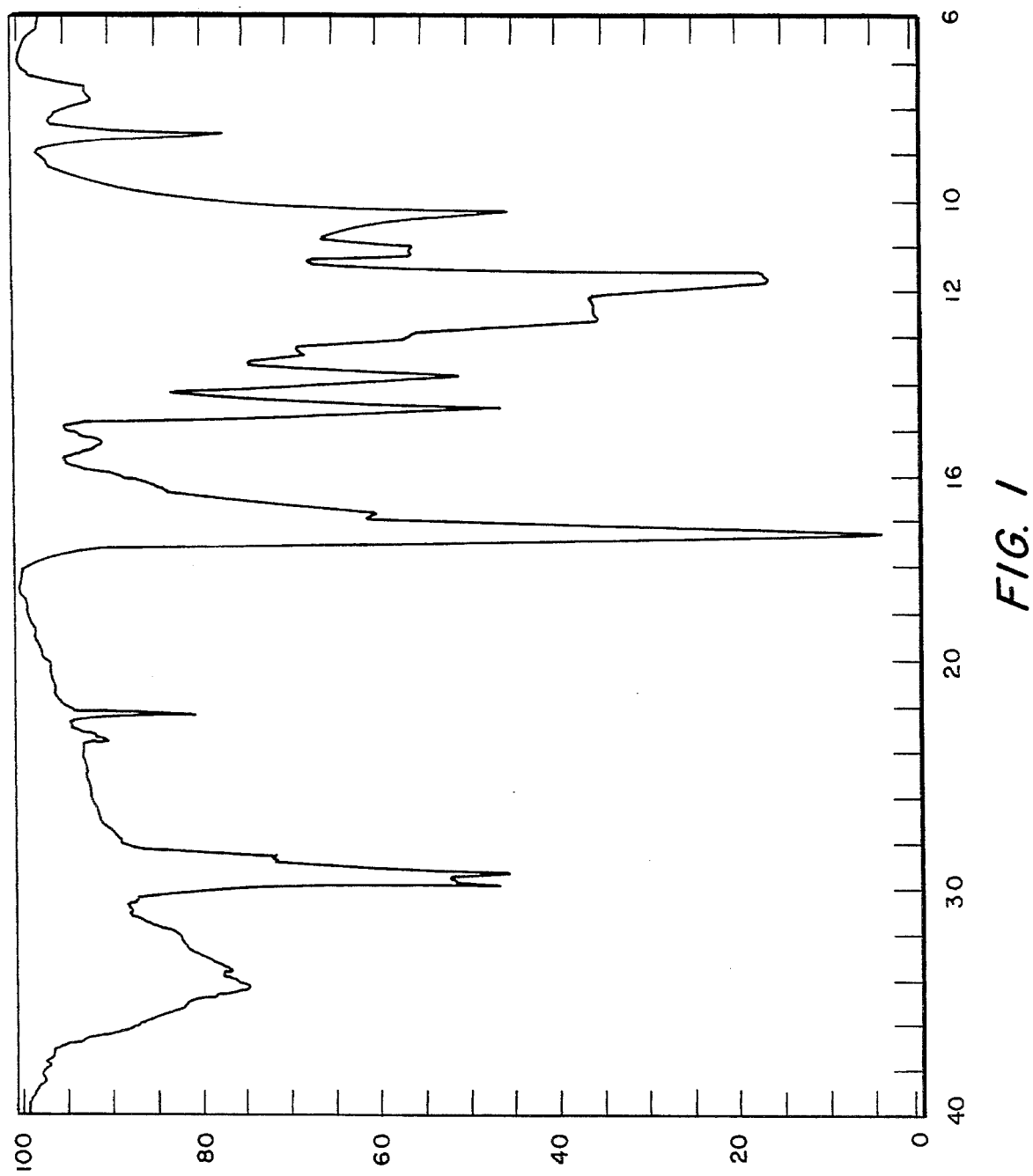
FIG. 1 is an infrared spectrophotometric graph of the copolymer that is an addition polymerization of a mixture of acrylic-type monomers and a nitrile-containing monomer that is useful as a component in the chemical treating composition and on the chemically treated fibers and reinforcement of the present invention.

By film forming material, it is meant that upon removal of any solvents present in the polymer emulsion, dispersion, suspension or solution, the polymer can coalesce to form a film on the surface of the fibrous material. Also as used herein, the term "fibrous material" includes one fiber, fibers, a bundle of fibers, strands, rovings and other collections of strands and fibers and also includes other reinforcing materials such as fibrils, flakes, beads and the like.

The crosslinkable polyurethane polymer is any aliphatic or aromatic or mixed aliphatic and aromatic polyurethane known to those skilled in the art to be a film forming polymer for utilization with fibrous materials. The preferred polyurethane is a thermoplastic aliphatic polyurethane utilized in the chemical treating composition as an oil-in-water emulsion. Suitable examples of such polyurethanes are given in U.S. Pat. Nos. 4,271,229 and 4,615,946 (Temple) hereby incorporated by reference. Other suitable examples include chain extended thermoplastic polyurethanes derived from chain extension of an isocyanate-terminated prepolymer prepared by the reaction of an aliphatic or cycloaliphatic diisocyanate with a polyalkylene ether polyol. The amount of the polyurethane polymer is an effective film forming amount derived from the aqueous emulsion. A suitable polyurethane emulsion is RUCOTHANE Rucothane latex having a trade designation of 2011L available from Ruco Chemical Corp. from New York. This material along with other RUCOTHANE Rucothane polyurethane latices are thermoplastic polyurethane latices comprised of high molecular weight aliphatic isocyanate-based thermoplastic elastomers with an anionic or nonionic surfactant, where the dispersion or latex has varying particle sizes. The latices typically have a polymer solids content ranging from around 55 to 65 percent by weight where the urethane polymer has an ester backbone. Also, polyurethane polymers made with isocyanates designated DESMODUR W available from Mobay Chemical Company may be used. The amount of the thermoplastic polyurethane latex present in the aqueous chemical treating composition ranges from a minor amount to a major amount of the solids in the composition so that in conjunction with the copolymer there is an effective film forming amount of the polymeric material in the composition. Preferably, the polyurethane is present in an amount of about 40 to about 95 weight percent of the nonaqueous solids of the chemical treating composition and from about 2 to about 30 weight percent of the aqueous chemical treating composition.

In addition to the polyurethane film forming polymer, at least one organofunctional silane coupling agent or one or more of its hydrolysis products are used in the chemical treating composition. Any suitable organofunctional silanes known to those skilled in the art may be used and one particularly suitable silane is the amino organofunctional silanes. Different types of these silane coupling agents and their amounts are like those disclosed in U.S. Pat. No. 4,271,229 (Temple) hereby incorporated by reference. Generally, the amount of the aminofunctional silane is in the range about 0.05 to about 2 weight percent of the nonaqueous components of the chemical treating composition.

Optionally, one or more fiber lubricants and/or processing aids may be present in the chemical treating composition such as cationic, anionic, or nonionic lubricants or mixtures thereof. Nonexclusive examples of suitable lubricants are given in U.S. Pat. No. 4,271,229 (Temple) hereby incorporated by reference. The amount of the lubricant can range from 0 to around 5 weight percent of the nonaqueous solids of the chemical treating composition. A nonexclusive example of a processing aid that is useful in the present invention is an epoxidized polyester disclosed in U.S. Pat. No. 3,459,585 (Killmeyer et al) hereby incorporated by reference. The amount of this epoxy polyester material, which is available through PPG Industries, Inc. under the trade designation RD-1135B, is generally in the range of about 2 to about 15 weight percent based on the nonaqueous components of the chemical treating composition.

The chemical treating composition also has present the additional polymerized copolymer of at least one acrylic-type monomer and an addition polymerizable monomer that is also matrix-resin miscible and reactable (hereinafter matrix resin interactive comonomer). Hereinafter the term "acrylic-type copolymer" refers to the addition polymerized copolymer. The term "acrylic-type" for the copolymer and for at least one type of monomer used in preparing the copolymer refers to acrylic monomers having the formula:

(Formula 1)

wherein X is a hydrogen atom or a methyl or other lower alkyl group and Y is selected from one of the following groups: —COOH; —COOR; —COOROH wherein in both instances R represents a hydrocarbon radical and/or hydroxymethyl and/or hydroxyalkyl or alkoxyalkyl radicals having from about 1 to about 20 carbon atoms. Also, the acrylic-type monomer can be a plurality of the aforementioned acrylic monomers to achieve a more thermally stable copolymer by using such a blend or mixture of the monomers to increase the critical temperature for the copolymer. The matrix resin-interactive addition polymerizable monomer is a copolymerizable monomer with one or more acrylic monomers and is an ethylenically unsaturated monomer, nonexclusive examples of which include: a) compounds having the formula $CH_2=CQZ$ (Formula 2) wherein 'Q' is a hydrogen atom or methyl and 'Z' is selected from —(C≡N) or any nitrile-containing monomers with ethylenic unsaturation such as acrylonitriles and methacrylonitrile and the like, or b) epoxy-containing monomers with ethylenic unsaturation like glycidylacrylate and/or glycidylmethacrylate and the like where in formula (2) 'Z' would be

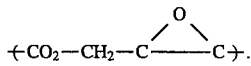

Additional different copolymerizable monomers can be present such as styrene, butadiene vinyl toluene and alpha-methyl styrene. Generally, the aqueous or oil-in-water emulsion or dispersion of the copolymer is formed by the copolymerization of a mixture of about 10 to about 99 parts by weight of at least one of the acrylic-type monomers and about 1 to about 90 parts by weight based on the total monomer mixture of the matrix resin interactive comonomer. The copolymer can be produced into an aqueous emulsion by any addition polymerization methods known to those skilled in the art such as bulk, emulsion, suspension, solution and slurry polymerization either by a free-radical or an anionic mechanism or by electrolysis preparation. For instance, a 75/25 methacrylate-acrylonitrile copolymer aqueous emulsion is prepared by the emulsion copolymerization by emulsifying the monomers with an anionic, cationic or nonionic dispersing agent of about 0.5 to about 6 percent. To such a mixture a polymerization initiator of the free radical type such as ammonium or potassium persulfate is introduced alone or in conjunction with an accelerator such as potassium metabisulfite or sodium thiosulfate. These catalysts may be used in proportions of 0.5 to 2 percent each based on the weight of the monomers to be copolymerized. Temperature may be from room temperature to 60° C. or more. Suitable anionic dispersing agents including the sodium salts of the higher fatty acid sulfates such as that of lauryl alcohol and the like or any of the nonionic type such as ethylene oxide modified alkyl phenols are used.

A suitable example of the copolymer is that available from Rhom & Haas Co., Philadelphia, Pa., under the trade designation RHOPLEX E-693 material. This material is a white emulsion having a solids content of 49.5 to 50.5 percent with a pH of 4.5 to 6.5 and a viscosity at LVT (1), 60 rpm 20–60 and having the infrared curve of FIG. 1. This copolymer is a self-crosslinking acrylic-type copolymer of the anionic emulsifying type with a density at 20° C. of 8.8 pounds per gallon and a minimum film forming temperature of +12° C. and a temperature at which the torsional modulus of an air dried film is 300 kilograms per centimeter$^2$ of +24° C. The amount of the copolymer present in the chemical treating composition generally ranges from a minor to a major amount of the non-carrier solids of the composition. The amount should at least be that which, in conjunction with the polyurethane, provides for an effective film forming amount of polymer in the fibrous reinforcement. Preferably, the amount of the copolymer is in a ratio of about 10:1 to 1:10 of copolymer to polyurethane or most preferably around 4:1 to 1:4, and to obtain the higher initial physical properties for a reinforced polymer an amount of around 1:1 to 1:4 copolymer to polyurethane, and the amount of the copolymer is in the range of about 5 to about 20 weight percent of the nonaqueous solids of the chemical treating composition.

The chemical treating composition may optionally have present a polyurethane crosslinking agent to crosslink the curable or crosslinkable polyurethane. Any composition known to those skilled in the art for crosslinking polyurethanes is suitable. A nonexclusive example is a blocked aliphatic polyisocyanate for instance, a blocked 1,6-hexamethylene diisocyanate-based adduct. Although monomeric blocked polyisocyanates that are water dispersible may also be used. These materials can be prepared from organic diisocyanates and contain biuret, allophanate or urethane groups or isocyanurate rings. Suitable polyisocyanates usable in preparing adducts for use as the monomer are those known to those skilled in the art such as ethylene diisocyanate; 1,4-tetramethylene diisocyanate; 1,6-hexamethylene diisocyanate, and the like. For polyisocyanate adducts containing biuret groups, any method known to those skilled in the art may be utilized where coreactants such as water, tertiary alcohols, primary and secondary monoamines and primary and secondary diamines can be used. Polyisocyanate adducts containing allophanate groups may be prepared by methods known to those skilled in the art such as British Patent No. 994,890 and German Offenlegungsschrift No. 2,040,645. Also polyisocyanate adducts containing urea and urethane groups can also be used. Suitable blocking agents for these polyisocyanate adducts are, for example, secondary or tertiary alcohols; C—H acid compounds and other blocking agents known to those skilled in the art. The amount of the crosslinking material that is used is generally a weight ratio of the crosslinking agent to the polyurethane resin of around 1:20 to 20:1. Preferably the crosslinking agent is present and in an amount that is effective in producing a reduced solvent swellable residue of the chemical treating composition upon removal of substantial quantities of the carrier when compared to uncrosslinked residues. The reduced swellability of residues or films can be measured in accordance with the polymer swellability test of ASTM (American Society of Testing Materials).

A particularly suitable crosslinking agent for the polyurethane is that obtainable from Mobay Corp., Pittsburgh, Pa., under the product name RAYBOND XW-116 Crosslinker, which is a blocked 1,6-hexamethylene diisocyanate-based adduct having components including butylacetate, triethylamine and N-methylpyrrolidone and which is a yellow liquid with a specific gravity of 1.1 at 25° C., a bulk density of 9.2 pounds per gallon and a percent volatiles of 35 by weight. The amount of the crosslinking agent can be varied depending upon the application of the treated fibrous material. When the fibrous material is used in a dark pigmented polymer matrix, higher amounts of the crosslinking material can be used. Otherwise to achieve good color of the reinforced polymer with the chemically treated fibrous material, the amount of the crosslinking agent should not be too great to result in a yellow color upon production of the reinforced polymer. This amount of the crosslinking agent is variable also depending on the amount of the antioxidant present in the chemical treating composition. Higher amounts of antioxidants or more effective antioxidants allow for the use of higher amounts of crosslinking agent.

Another optional component present in the chemical treating composition which is preferably present is a water soluble or dispersible metal deactivating agent such as the polydentate ligands including bi- to octa-dentates and/or compounds having the formula:

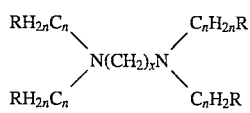

wherein x is an integer having a value of from 1 to about 6, preferably 1 to 4, and R is a carboxyl group or hydroxyl group or the salts, ethers or esters thereof. Examples of these well known compounds are ethylene diamine tetraacetic acid (an alkylene diamine(penta)dentate), propylene diamine tetraacetic acid as well as the sodium or potassium or ammonium salts thereof and appropriate chemical mixtures thereof and N,N,N, 'N'-tetrakis(2-hydroxypropyl)ethylenediamine. The amount of this material present in the chemical treating composition can be generally an effective metal chelating amount and preferably it is present in an amount of about 0.01 to about 2 percent of the nonaqueous solids of the chemical treating composition. These amounts depend on the quantity of metals present in the chemical treating composition. Higher amounts of metals translate into higher amounts of metal deactivators being useful in the composition.

Another optional component of the chemical treating composition which is preferably present is one or more antioxidants. Any emulsifiable, dispersible, or soluble antioxidant may be used that is known to those skilled in the art. Any antioxidant known to those skilled in the art for use with coatings and films on discrete surfaces such as fibers can be used. For instance, the antioxidants of U.S. Pat. No. 4,483,948 may be used in the chemical treating composition and U.S. Pat. No. 4,483,948 is hereby incorporated by reference.

Another suitable antioxidant is one that is effective at the temperatures for drying chemically treated fibrous material to remove carriers such as water in forming the film or dried residue of the chemical treatment on the fibrous material. Hereinafter these antioxidants are referred to as "low temperature antioxidants". Nonexclusive examples of such an antioxidant include: halogenized hydroxy ammonium compounds, hydrosulfites, bisulfites, phosphorus acid and/or phosphites and phosphite-containing reducing agents selected from alkali metal, alkaline earth metal hypophosphites or hydrogen phosphites and ammonium hypo or hydrogen phosphites. The amount of the phosphite-containing reducing agent type antioxidant ranges from around 0.001 to around 1 weight percent of the nonaqueous solids of the chemical treating composition of the above and from around 1 weight percent or more for the other low temperature antioxidants. The preferred hypophosphite present is the sodium hypophosphite in an amount up to around 1 and most preferably from 0.1 to around 0.3 weight percent of the aqueous chemical treating composition. A suitable sodium hypophosphite is that available from Fisher Scientific Company as solid sodium hypophosphite having the formula $NaH_2PO_2 \cdot H_2O$. This material is water soluble and when the carrier for the chemical treating composition is water, it is merely dissolved into the chemical treating composition or predissolved and added to the chemical treating composition.

Another suitable type of antioxidants are the "higher temperature antioxidants". These antioxidants are the alkali metal phenyl phosphonates, an example of which is the sodium benzene phosphonate. This material is present in an amount of about 0.01 to around 1 and most preferably 0.01 to 0.1 weight percent of the chemical treating composition, although greater amounts can be used if additional benefits are required. An example of sodium benzene phosphonate is that available from Stauffer Chemical Company having the formula $C_6H_6O_2PNa$ with a formula weight of 164. Other examples of suitable higher temperature antioxidants are the thioethers and polymers thereof. A nonexclusive example of these is di(tridecyl)thiodipropionate with a chemical formula of $S(CH_2CH_2COOC_{13}H_{27})_2$. A suitable thiodipropionate is that available from Grace from their Evans Chemetics Unit in Waterloo, N.Y., under the product name EVANSTAB 13. The amount of this material is generally in the range of about 1 to about 15 weight percent of the chemical treating composition although higher amounts can be used to produce concominant increased advantages. The higher temperature antioxidants are referred to by this terminology because they are more effective at temperatures of molding reinforced polymers rather than the temperature of drying the reinforcing fibers. The former temperature is usually higher than the latter.

Also, mixtures of these antioxidants are useful in the chemical treating composition and preferably a mixture is used. The mixture is of at least one low temperature antioxidant with at least one high temperature antioxidant. The mixture of antioxidants can be incorporated into the chemical treating composition or added in a secondary treatment after the chemical treatment has first been applied to the fibers of reinforcement. Also, one antioxidant, either the low or high temperature antioxidant, can be added with the chemical treating composition with subsequent addition of the other type of antioxidant. The ratios of the low temperature antioxidant and the high temperature antioxidant in the mixture is generally in the ratio of around 1:1 to 1:20. The amounts of the low and high temperature antioxidants used in the mixture are the same as those amounts used in their separate addition.

The carrier for the chemical treating composition is any material known to those skilled in the art for applying the chemical treatment to fibers during their formation or after their formation or to other types of reinforcement during their formation. The carrier can be an organic solvent or water or a combination to produce foams and gels of the chemical treatment. Preferably water is the carrier to give an aqueous chemical treating composition. The water is present in effective amounts to give total solids (nonaqueous content) in the range sufficient for a viscosity of the chemical treatments for application to the fibers for reinforcement. Generally, the water is present in an amount sufficient to give a total solids in the range of about 1 to about 50 weight percent and preferably about 5 to 20 weight percent. In any event the amount of the various components and the amount of water should be balanced so that the viscosity of the solution is not greater than around 150 centipoise at 20° C. Solutions having viscosities greater than 150 centipoise are difficult to apply as aqueous emulsion, dispersions or solutions to fibers during their formation, especially to glass fibers that are formed from molten streams of glass with standard type application equipment without causing the breakage of the continuity of the fibers. It is preferred that the viscosity of the aqueous chemical treating composition for application to glass fibers during their formation is in the range of about 20 to 60 centipoise at 20° C. for best results. If the aqueous chemical treating composition is prepared with thixotropic agents to make it a foam or gel, then the viscosity will be that appropriate to such formulations and the application equipment will be appropriate for applying foams and gels to the fibers or reinforcement.

The aqueous chemical treating composition can be prepared by addition of any of the components simultaneously or sequentially to each other, but it is preferred to predilute all of the components before they are combined and diluted with water into the aqueous chemical treating composition. This is to enhance their solubility, dispersibility or emulsifiability.

The fibrous materials that are treated with the aqueous chemical treating composition are the high modulus fibers such as glass fibers, carbon fibers and polyaramide fibers. Suitable examples of glass fibers include "E-glass" or "621-glass" fibers and low or free boron or fluorine derivatives thereof. The aqueous chemical treating composition is applied to the fibers preferably in the forming operation of the fibers, and the fibers are formed into continuous strands and dried to remove water as the carrier, and the strands are subsequently chopped. Alternatively, the aqueous chemical treating composition is applied to the fibers in a wet chop forming operation. The amount of the dried residue of the aqueous chemical treating composition on the fibers is generally in the range of about 0.1 to about 2 percent LOI (loss on ignition). When the aqueous chemical treating composition is applied to the fibers, the fibers can be dried in such a manner to avoid formation of undesirable colors, so the drying temperature should not be too high to produce non-white colors when any heat sensitive components are present in the aqueous chemical treating composition. When the low temperature antioxidant is present in the chemical treating composition, higher temperatures of drying can be used to enhance the integrity of the fibers comprising the strand or strands of reinforcement. Upon drying, a moisture-reduced residue is formed on the fibers and these fibers are useful in reinforcing polymers especially polyamide homopolymers and copolymers. Generally, drying of the fibers occurs any time before the fibers contact the matrix polymer. The drying temperature is in the range of ambient to around less than 350° F. (177° C.) with lower temperatures requiring longer drying times. Preferably the treated glass fibers are dried at a temperature in the range of about 280° F. to 290° F. (138° C. to 143° C.) for a period of time from 10 to 12 hours to reduce the moisture content of the fibers to about 0. The fibers which include a plurality of fibers can have any secondary chemical treatment applied to them when they are chopped subsequently to their formation. Generally chopped lengths vary from around less than $\frac{1}{16}$" to greater than 2", but preferably in the range of about $\frac{1}{8}$" to around $\frac{1}{2}$".

Not only do the reinforcing fibers benefit from treatment with the aforementioned chemical treating composition, but also inorganic fillers sometimes used in reinforced composites would benefit from such treatment. Nonexclusive examples of such inorganic fillers include mica, wollastonite, talc, clay and novaculite. Contacting the fillers with the aqueous chemical treating composition is accomplished by spraying or dipping or the like as a convenient way of treating them.

The dried fibers are used to reinforce polymeric matrices in any of the molding processes known to those skilled in the art utilizing either chopped strand, continuous strand or a mixture thereof. Preferably, the chopped fiber strands are mixed with the matrix polymer resin in a dry powder mixture to produce a homogeneous batch of matrix polymer. The batch can be compression or injection molded to produce the fiber reinforced polymeric part or shaped device. These chemically treated fibers are used in molding the fiber reinforced polymers such as fiber reinforced polyamides, and polyalkylene terephthalates, including poly(ethylene terephthalate) and poly(butylene terephthalate) and polyphenylene oxide, polystyrenics and other similar polar thermoplastic polymers, copolymers, blends and alloys.

PREFERRED EMBODIMENT

The preferred embodiment utilizes glass fibers that are dry chopped glass fibers having a dried residue of the chemical treating composition where the fibers have a length of around ⅛" to ½". The fibers have conventional filament diameters that can range from around 1 micron to greater than 30 microns but are preferably in the diameter of 10 to 16 microns. The aqueous chemical treating composition preferably has the formulation with ranges of preferred amounts for the components as shown in Table A.

mix tank. The polyisocyanate crosslinking agent is added to a premix tank and has added to it hot water with stirring. After the emulsion forms, it is stirred for 5 minutes and then added to the main mix tank. The acrylic copolymer is added to a premix tank with a small amount of water, around ⅟₃₀ of the total volume of water needed for the chemical treating composition and the mixture is stirred for 5 minutes and added to the main mix tank. The aqueous chemical treating composition is diluted with deionized water to its final desired volume. The aqueous chemical treating composition is applied to glass fibers during their formation, preferably those having a G-fiber diameter, and the treated fibers are formed into strands, but the strand formation can be anything ranging from DE-75 to around K-18, but preferably the strand construction is G-31 strands. The aqueous chemical treating composition is applied at such a rate to give an LOI on the strand of around 1 to 1.4 weight percent of the treated strand.

After the treated glass fiber strands are formed into a forming package of continuous fiber wound in overlapping layers on a winder, a plurality of the packages are dried at a temperature around 285° F. (141° C.) for a period of around 11 hours. This drying removes water and crosslinks the polyurethane through the crosslinking agent to the reduced swellable residue. A plurality of the dried packages are located so that the strands can be removed from the packages and preferably treated with an antistat and alkali metal phenyl phosphonate antioxidant as a post treatment

TABLE A

|  | Lbs/100 Gallons | Solids % |
| --- | --- | --- |
| RUCOTHANE 2011L Crosslinkable polyurethane | 68–75 | 62 |
| Water for RUCOTHANE | 20 gallons |  |
| A-1100 gamma-aminopropyltriethoxy silane | 6–7 | 62 |
| Water for A-1100 | 40 gallons |  |
| HAMPENE NA2 disodium ethylene diamine tetraacetate | 0.15–0.3 | 100 |
| Sodium Hypophosphite | 0.5–1.5 | 100 |
| Water for HAMPENE and Hypophosphite | 3 gallons |  |
| RD-1135B epoxidized polyester | 10–15 | 20 |
| EVANSTAB 13 Di(tridecyl)thiodipropionate | 2–3 | 100 |
| RAYBOND XW-116 (blocked aliphatic polyisocyanate crosslinker) | 6–7 | 70 |
| Hot water for RAYBOND | 3 gallons |  |
| RHOPLEX E-693 acrylic copolymer | 25–35 | 50 |
| Water for RHOPLEX | 3 gallons |  |
| Water for dilution to 100 Gallons | | |
| Solids: | 9.0 ± 0.3 | |
| pH: | 10 ± 0.5 | |
| Viscosity: (cp)* | 3 ± 1 | |
| Temperature (°F.) | 80 ± 10 | |

*cp = centipoise

The aqueous chemical treating composition is formulated by adding the polyurethane latex to a premix tank with slow stirring and the addition of about ⅕ of the total volume of water as deionized water. About ⅖ of the total volume of water is added to a main mix tank and the amino organofunctional silane is added to this deionized water with slow stirring. The polyurethane latex premix is added to the silane mixture in the main mix tank. To a premix tank a sufficient amount of deionized water is added to dissolve the ethylene diamine tetraacetic acid and the sodium hypophosphite with stirring. This solution is then transferred to the main mix tank. The epoxy polyester polymer is added to a tank with an Eppenbach mix with a small amount of water and the yellowish liquid di (tridecyl)thiodipropionate is added to this mixture and stirred for 5 minutes and added to the main before the fibers are chopped into dry chopped strands. The dry chopped strands are preferably molded with polyamide resin in injection molding processes to produce fiber reinforced polyamide having good solvent resistance especially in solvents like ethylene glycol.

Seven aqueous chemical treating compositions were prepared in a manner similar to that of the preferred embodiment with similar components as shown in Table 1.

TABLE 1

| | (gm/gallon) | | | | | | |
|---|---|---|---|---|---|---|---|
| | 1 | 2 | 3 | 4 | 5 | 6 | 7 |
| curable polyurethane emulsion (RUCOTHANE 2011L) | 330 | 385 | 330 | 385 | 366 | 347 | 330 |
| gamma aminopropyltriethoxy silane | 31.1 | 31.1 | 31.1 | 31.1 | 31.1 | 31.1 | 31.1 |
| epoxy polyester process aid (RD-1135B) | 55 | 55 | 55 | 55 | 55 | 55 | 55 |
| disodium salt of ethylene diAmine tetraacetate, dihydrate (EDTA) | 1 | 1 | 1 | 1 | 1 | 1 | 1 |
| sodium hypophosphite | 6 | 6 | 6 | 6 | 6 | 6 | 6 |
| blocked aliphatic polyisocyanate cross-linking agent for polyurethane | 15 | 15 | 30 | 30 | 30 | 30 | 30 |
| polyacrylate copolymer | 138 | 68 | 138 | 68 | 91 | 114 | 138 |
| di(tridecyl) thiodipropionate EVANSTAB antioxidant | — | — | 12.1 | 12.1 | 12.1 | 12.1 | 12.1 |
| IRGANOX | | | | | | | 6 |
| water to final volume of 1 Gal | — | — | — | — | — | — | — |
| solids | 8.9 ± 2 | — | 9 | 9 | 9 | 9 | 9 |

The seven chemical treating compositions were applied to a plurality of G-fibers that were gathered into strands having a construction of G-15. The strands were dried in a manner similar to that of the preferred embodiment and were prepared into dry chopped strands of ⅛" without the addition of an additional antioxidant in a post treatment. These fibers were used in injection molding with polyamide resin, which was a nylon 6,6 having the trade designation ZYTEL 101 NC10, and molded into tensile bars and disks. These reinforced polyamides were tested for tensile strength, flexural strength, flex modulus and Izod impact according to standard ASTM test methods, including respectively D-638, D-790 and D-256. These data are presented in Table 2. Also, Table 2 presents data for a funnel flow test which qualifies glass fibers for handleability and processability in forming reinforced polymers. The funnel flow test was conducted by placing a given quantity of chopped glass fiber strands that were dry chopped in a funnel equipped for vibration. The time it took the total weight to pass through the funnel was recorded.

In addition to the initial tensile strength, flexural strength and flex modulus of the reinforced polyamide, additional samples were soaked in ethylene glycol for various times: 200 hours, 400 hours and 800 hours. The samples after this soaking at a temperature of 130° C. were then measured for tensile strength using the same ASTM method as used for the measurement of the initial tensile strength. These results are also recorded in Table 2. In addition to tensile strength after ethylene glycol soaking, long term heat aging studies were conducted on a separate batch of fiber reinforced polyamides made with the chemically treated fibers of the compositions from Table 1. The long term heat aging was conducted by placing the samples in a temperature environment of 180° C. for various times: 400, 800 and 1200 hours, and tensile strength tests were conducted on the heat aged samples by the same ASTM tensile strength test as used for the initial and ethylene glycol-soaked tensile strength measurement. Also a QUV weatherometer test (accelerated weather test) was done at various times of 400 and 800 hours. Table 2 also lists the data for this test. This test was conducted in accordance with the QUV Weatherometer procedure where the cycle was 4 hours at 70° C., dry under UV light, and 4 hours at 50° C. with condensation and dark for several hours. The percent glass in the fiber reinforced polyamides of Table 2 are also listed for purposes of comparison between the samples.

In addition, Table 2 has two illustrative examples, the first of which is for fiber reinforced polyamides using fibers treated in accordance with U.S. Pat. No. 4,271,229. The second illustrative example is a commercially available chemically treated glass fiber available from Nippon Sheet Glass Co. that has been used in reinforcing polyamides.

TABLE 2

| | Ill Ex 1 | Ill Ex 2 | 1 | 2 | 3 | 4 | 5 | 6 | 7 |
|---|---|---|---|---|---|---|---|---|---|
| Funnel flow | 21 | — | 51 | 34 | 28 | 24 | 25 | 24 | 23 |
| tensile strength × $10^3$ psi | 25.4 | 24.4 | 28.8 | 29.4 | 25.3 | 25.8 | 25.8 | 25.1 | 25.4 |
| flexural strength × $10^6$ psi | 39.4 | 39.5 | 40.7 | 41.4 | 39.6 | 39.4 | 40.0 | 39.1 | 39.9 |
| flexural modulus | 1.33 | 1.3 | 1.36 | 1.36 | 1.33 | 1.31 | 1.32 | 1.32 | 1.33 |
| izod impact | 1.94 | 1.87 | 2,02 | 2.03 | 1.83 | 1.89 | 1.86 | 1.8 | 1.8 |
| ethylene glycol tensile × $10^3$ | | | | | | | | | |
| 130° C. for 200 hrs. | 9.3 | 13.0 | 13.4 | 13.6 | 12.8 | 12.1 | 11.9 | 11.8 | 11.9 |
| 400 hrs. | 8.5 | 12.5 | — | — | 12.4 | 11.5 | 11.3 | 11.2 | 11.5 |
| 800 hrs. | 8.0 | 12.0 | — | — | 12.2 | 11.1 | 11.1 | 11.1 | 11.3 |
| % retention | | | 46.5 | 46.5 | — | — | — | — | — |
| long term heat aging | | | | | | | | | |
| 180° C. for 400 hrs. | 24.6 | 23.7 | 26.8 | 27.3 | 25.4 | 25.2 | 25.9 | 25.0 | 25.6 |

TABLE 2-continued

|  | Ill Ex 1 | Ill Ex 2 | 1 | 2 | 3 | 4 | 5 | 6 | 7 |
|---|---|---|---|---|---|---|---|---|---|
| 800 hrs. | 19.0 | 21.1 | 23.6 | 23.8 | 21.4 | 21.3 | 20.8 | 18.6 | 20.2 |
| 1200 hrs. | 15.7 | 17.0 | 21.4 | 21.7 | 18.0 | 16.6 | 17.1 | 16.4 | 17.6 |
| QUV |  |  |  |  |  |  |  |  |  |
| 400 hrs. | 20.5 | 20.0 | — | — | 20.8 | 22.4 | 20.8 | 20.7 | 22.1 |
| 800 hrs. | 18.5 | 18.1 | — | — | 19.3 | 19.3 | 18.1 | 19.1 | 18.2 |
| % Glass ⅛" | 33.2 | 32.97 | 32.6 | 32.7 | 32.9 | 33.0 | 32.8 | 33.0 | 32.9 |

Table 2 shows the chemically treated fibers of the present invention have comparable, initial, tensile strength, flexural strength and flexural modulus and Izod impact values to the fibers produced in accordance with U.S. Pat. No. 4,271,229. Also, the fibers of the present invention have improved tensile properties after ethylene glycol soaking compared to the fibers produced in accordance with U.S. Pat. No. 4,271,229. Also, the fibers of the present invention have comparable or improved heat aging properties to those of the fibers produced in U.S. Pat. No. 4,271,229. Also, the fibers of the present invention have improved initial tensile properties to the commercially available fibers of illustrative Example 2. The tensile properties of the fibers of the present invention are comparable after ethylene glycol soaking to the fibers of illustrative Example 2, and they have improved values after heat aging to the samples having the fibers of the commercially available illustrative Example 2. Therefore, Table 2 shows the chemically treated glass fibers enabling the production of fiber reinforced polymers having a marriage of properties of good initial strength and good solvent resistance for solvents like ethylene glycol and good heat aging properties and good weather stability.

Figure 2:
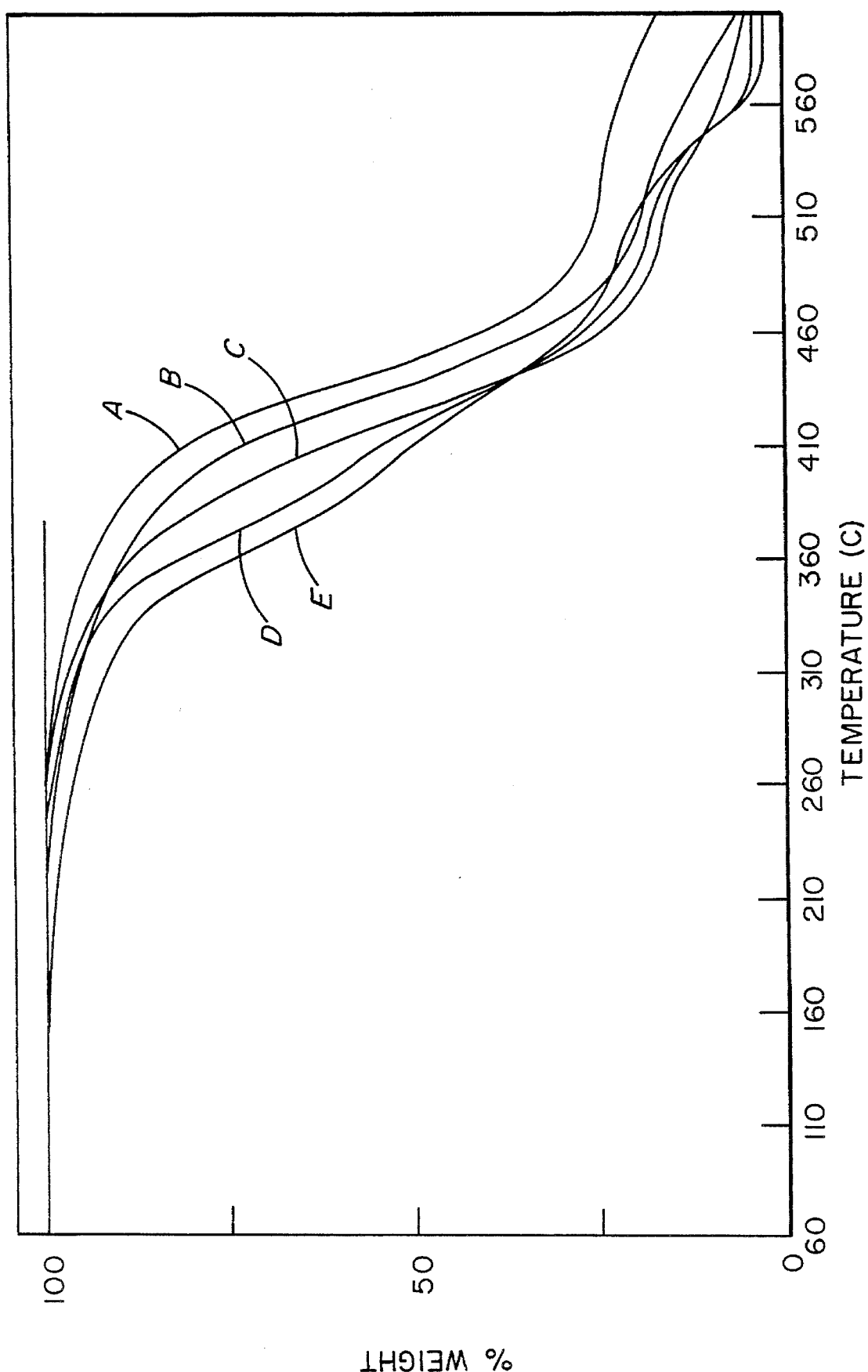
FIG. 2 is a series of three thermal gravimetric analysis curves of dried residues of chemical treating compositions having various components.

FIG. 2 illustrates the improvement in thermal stability for the dried residue of the chemical treating composition. FIG. 2 is a composite of three thermal gravimetric analyses (TGA) curves showing the improved thermal stability of dried residues having components of the present invention for curves A and B over curve E. Curve E is the TGA curve for a residue produced in accordance with U.S. Pat. No. 4,271,229. Curve B is the TGA curve of the residue having a polyurethane polymer, the acrylic copolymer and aminosilane, the epoxy polyester polymer processing aid and the crosslinking agent formed into a residue by drying the aqueous chemical treating composition. Curve A is a residue similar to that of the TGA curve of Curve B which also includes the sodium hypophosphite plus ethylenediamine tetraacetate and sodium benzene phosphite. Curves A and B are further to the right than Curve E showing the improvement in thermal stability from a material similar to U.S. Pat. No. 4,271,229.

We claim:
1. Chemical treating composition for application to reinforcing materials for polymers to form a thin film on the reinforcing materials to enhance reinforcing properties in the reinforced polymers, comprising:
   a. at least one crosslinkable polyurethane film forming polymer in an effective film forming amount,
   b. at least one organofunctional silane coupling agent or its hydrolysis products in an effective coupling agent amount,
   c. a copolymer of at least one addition polymerizable acrylic monomer and at least one monomer that is addition polymerizable and matrix-resin-miscible and polar matrix-resin-reactable, wherein the copolymer is present in an effective film forming amount for solvent resistance and wherein the acrylic monomer is selected from the group consisting of alkyl acrylics, alkyl acrylates, alkyl methacrylates, hydroxyalkyl acrylates, hydroxyalkyl methacrylates and mixtures thereof and the polar matrix resin-reactable monomer is selected from the group consisting of epoxy-containing monomers and nitrile-containing monomers;
   d. crosslinking agent for the polyurethane in an effective amount to produce reduced-swellable dried residue of the chemical treating composition compared to an uncrosslinked residue as a thin film on a substantial portion of the reinforcing material;
   e. at least one antioxidant selected from the group consisting of: (i) low temperature antioxidants selected from the group consisting of: halogenated hydroxyl ammonium compounds, hydrosulfites, bisulfites, phosphorus acid, phosphites and phosphite-containing reducing agent selected from the group consisting of ammonium hypophosphite, sodium hypophosphite, potassium hypophosphite and mixtures thereof in an effective antioxidant amount and (ii) antioxidant effective at higher temperatures selected from the group consisting of alkali metal phenyl phosphonates, alkaline earth metal phenyl phosphonates, thioethers, polymers of thioethers and mixtures thereof in an effective antioxidant amount and (iii) combinations of one or more low temperature antioxidants and high temperature antioxidants; and
   f. a carrier in an effective application amount for treating the reinforcement with the chemical treating composition.

2. Chemical treating composition of claim 1 wherein the acrylic monomer has the formula

(Formula 1)

wherein X is a hydrogen atom, methyl or other lower alkyl group and Y is a group selected from the group consisting of —COOH, —COOR, and —COOROH wherein R represents a hydrocarbon radical, hydroxyalkyl radical, or alkoxyalkyl radical having from about 1 to about 20 carbon atoms; and wherein the matrix resin-reactable monomer is selected from the group consisting of: (a) compounds having the formula

(Formula 2), wherein Q is a hydrogen atom or methyl and Z is selected from a nitrile containing monomer with ethylenic unsaturation and (b) an epoxy containing monomer selected from the group consisting of glycidyl acrylate and glycidyl methacrylate.

3. Chemical treating composition of claim 1 which includes a metal deactivator selected from the group consisting of polydentate ligands and compounds having the formula

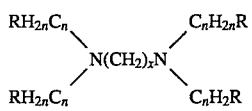

wherein x is an integer with a value from 1 to about 6, n is an integer with a value from 1 to about 6 and R is a carboxylic acid group, hydroxyl group, carboxylic acid alkyl ester group or sodium, potassium or ammonium salt of carboxylic acid, present in an effective metal chelating amount.

4. Chemical creating composition of claim 3, wherein the metal deactivator is a disodium salt of ethylenediamine tetraacetate dihydrate.

5. Chemical treating composition of claim 1, wherein the crosslinkable polyurethane is an aliphatic thermoplastic polyurethane polymer present in an oil-in-water emulsion or dispersion.

6. Chemical treating composition of claim 1, wherein the organofunctional silane coupling agent is an amino organosilane coupling agent selected from the group consisting of gamma-aminopropyltriethoxy silane; polyaminoalkyl alkoxysilanes and their hydrolyzed derivatives.

7. Chemical treating composition of claim 1, wherein the copolymer is an acrylic-acrylonitrile copolymer having a ratio of acrylic to acrylonitrile of 75:25.

8. Chemical treating composition of claim 1, wherein the carrier is water in a predominant amount of the chemical treating composition.

9. Chemical treating composition of claim 1, wherein the crosslinking agent is selected from the group consisting of: blocked aliphatic polyisocyanate and its adducts containing biuret or allophanate groups, where the blocking agent is selected from the group consisting of secondary alcohols, tertiary alcohols and C—H acid compounds and wherein the weight ratio of the crosslinking agent to the polyurethane resin ranges from 1:20 to 20:1.

10. Chemical treating composition of claim 1, wherein the crosslinkable polyurethane polymer and the copolymer are present from the addition of separate oil-in-water emulsions or dispersions containing same.

11. Chemical treating composition of claim 1, wherein the ratio of the crosslinkable polyurethane film forming polymer to the copolymer ranges from 1:10 to 10:1.

12. Chemical treating composition of claim 11, wherein the ratio of the crosslinkable polyurethane film forming polymer to the copolymer ranges from 1:1 to 4:1 and the amount of the copolymer is in the range of about 5 to about 20 weight percent of the solids.

13. Chemical treating composition of claim 1, wherein the copolymer contains monomers selected from the group consisting of styrene, butadiene, vinyl toluene and alpha-methyl styrene.

14. Chemical treating composition of claim 1, wherein the copolymer is an aqueous emulsion of a self-crosslinking acrylic copolymer containing 75:25 methacrylate-acrylonitrile, prepared by emulsion copolymerization of the monomers in the presence of about 0.5 to about 6 percent of an anionic, cationic or nonionic dispersing agent in the presence of free radical initiator selected from the group consisting of: ammonium and potassium persulfate, which is introduced alone or in conjunction with an accelerator selected from the group consisting of potassium metabisulfite and sodium thiosulfate along with anionic dispersing agents selected from the group consisting of the sodium salts of the higher fatty acid sulfates selected from the group consisting of lauryl alcohol and ethylene oxide modified alkyl phenols and wherein the emulsion has a solids content of 49.5 to 50.5 percent, a pH of 4.5 to 6.5 and a viscosity at LVT (1), 60 rpm of 20–60 centipoise with a density of 8.8 pounds per gallon at 20° C. and a minimum film forming temperature of +12° C.

15. Chemical treating composition of claim 1 having an epoxy-containing polyester processing aid.

16. Chemical treating composition of claim 1, wherein the antioxidant of (e) is water soluble.

17. Fibrous reinforcement selected from the group consisting of fibers, bundles of fibers, strands, roving, flakes, and beads having a thin film of the chemical treating composition of claim 1 over a substantial portion of the surface of the fibrous materials.

18. Chemical treating composition for application to reinforcing materials for polymers to form a thin film on the reinforcing materials to enhance reinforcing properties in the reinforced polymers, comprising:

a. at least one crosslinkable polyurethane film forming polymer in an effective film forming amount, b. at least one organofunctional silane coupling agent or its hydrolysis products in an effective coupling agent amount, c. a copolymer of at least one addition polymerizable acrylic monomer and at least one monomer that is addition polymerizable and matrix-resin-miscible and polar matrix-resin-reactable, wherein the copolymer is present in an effective film forming amount for solvent resistance and wherein the acrylic monomer is selected from the group consisting of alkyl acrylics, alkyl acrylates, alkylmethacrylates, hydroxyalkyl acrylates, hydroxyalkyl methacrylates and mixtures thereof and the polar matrix resin-reactable monomer is selected from the group consisting of epoxy-containing monomers and nitrile-containing monomers;

d. an epoxy-containing polyester processing aid;

e. at least one antioxidant selected from the group consisting of: i) low temperature antioxidants selected from the group consisting of: halogenated hydroxyl ammonium compounds, hydrosulfites, bisulfites, phosphorous acid, phosphites and phosphite-containing reducing agent selected from the group consisting of ammonium hypophosphite, sodium hypophosphite, potassium hypophosphite and mixtures thereof in an effective antioxidant amount; and ii) antioxidant effective at higher temperatures selected from the group consisting of alkali phenyl phosphonates, alkaline earth metal phenyl phosphonates, thioethers, polymers of thioethers and mixtures thereof in an effective antioxidant amount; and iii) combinations of one or more low temperature antioxidants and high temperature antioxidants; and f. carrier in an effective application amount for treating the reinforcement with the chemical treating composition.

19. Chemical treating composition for application to reinforcing materials for polymers to form a thin film on the reinforcing materials to enhance reinforcing properties in the reinforcing polymers, comprising:

a. at least one crosslinkable polyurethane film forming polymer in an effective film forming amount, b. at least one organofunctional silane coupling agent selected from the group consisting of aminoalkyl alkoxysilanes and polyaminoalkyl alkoxysilanes in an effective coupling agent amount, c. a self crosslinking copolymer of at least one addition polymerizable acrylic monomer and at least one matrix-resin miscible and reactable monomer selected from the group consisting of an addition polymerizable epoxy-containing monomer and nitrile containing monomer selected from acrylonitrile, methacrylonitrile, and $C_2$–$C_4$ nitrile-containing groups, wherein the copolymer is present in an effective film forming amount, d. at least one antioxidant selected from the group consisting of: i) low temperature antioxidants selected from the group consisting of: halogenated hydroxyl ammonium compounds, hydrosulfites, bisulfites, phosphorous acid, phosphites and phosphite-containing reducing agent selected from the group consisting of metal hypophosphites, ammonium hypophosphite and mixtures thereof in an effective antioxidant amount and ii) antioxidant effective at higher temperatures selected from the group consisting of alkali metal phenyl phosphonates, alkaline earth metal phenyl phosphonates, thioethers, polymers of thioethers and mixtures thereof in an effective antioxidant amount; and iii) combinations of one or more low temperature antioxidants and high temperature antioxidants; and e. carrier in an effective amount for application of the chemical treating composition to the reinforcement.

20. Chemical treating composition of claim 19, which includes a crosslinking agent for the polyurethane selected from the group consisting of blocked polyisocyanates and blocked polyisocyanate adducts in an effective crosslinking amount to produce a dried residue of the chemical treating composition with reduced solvent swellability compared to an uncrosslinked residue, wherein the ratio of the crosslinking agent to the polyurethane ranges from 20:1 to 1:20.

21. Chemical treating composition of claim 19, wherein the polyurethane and the copolymer are present in oil-in-water emulsions or dispersions in the chemical treating composition.

22. Chemical treating composition of claim 19 which includes a metal deactivating agent selected from the group consisting of polydentate ligands and metal deactivating agents having the following formula:

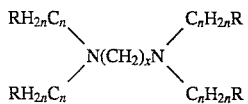

wherein x is an integer with a value from 1 to about 6 and wherein n is an integer with a value from 1 to about 6 and wherein R is a carboxylic acid group, hydroxyl group, carboxylic acid alkyl ester group or sodium, potassium or ammonium salt of carboxylic acid and wherein the metal deactivating agent is present in an effective metal chelating amount.

23. Chemical treating composition of claim 2, wherein the metal deactivating agent is a disodium salt of ethylenediamine tetraacetate dihydrate.

24. Chemical treating composition of claim 19 having an antistat and additional antioxidant selected from the group consisting of alkali metal phosphonates and alkaline earth metal phosphonates.

25. Chemical treating composition of claim 19, wherein the acrylic monomer is selected from the group consisting of alkyl acrylates, alkyl acrylics, alkyl methacrylates, hydroxyalkyl acrylates, hydroxyalkyl methacrylates and mixtures thereof.

26. Chemical treating composition of claim 19, which includes an epoxy-containing polyester processing aid.

27. Chemical treating composition of claim 19, wherein the carrier is water and the chemical treating composition is essentially free of fiber lubricant.

28. High modulus fibers selected from the group consisting of carbon fibers, polyaramide fibers and glass fibers having at least a portion of their surfaces treated with the dried residue of a chemical treating composition of claim 19.

29. Chemical treating composition for application to reinforcing materials for polymers to form a thin film on the reinforcing materials to enhance reinforcing properties in the reinforced polymers, comprising, a. at least one crosslinkable polyurethane film forming polymer in an effective film forming amount, b. at least one organofunctional silane coupling agent or its hydrolysis products in an effective coupling agent amount, c. a copolymer of at least one addition polymerizable acrylic monomer and at least one monomer that is addition polymerizable and matrix-resin-miscible and matrix-resin-reactable, wherein the copolymer is present in an effective film forming amount for solvent resistance, d. metal deactivator selected from the group consisting of: polydentate ligands and compounds having the formula:

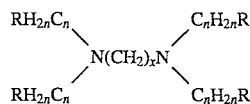

wherein x is an integer with a value from 1 to about 6, and wherein n is an integer with a value from 1 to about 6 and R is a carboxylic acid group, hydroxyl group, carboxylic acid alkyl ester group or sodium, potassium or ammonium salt of carboxylic acid present in an effective metal chelating amount; and e. a carrier in an effective application amount for treating the reinforcement with the chemical treating composition.

30. Chemical treating composition of claim 29, wherein the addition polymerizable, matrix-resin-miscible and matrix-resin-reactable monomer is a nitrile-containing monomer selected from the group consisting of acrylonitrile, methacrylonitrile and nitrile-containing monomers having two to four carbon atoms and wherein the acrylic monomer is selected from the group consisting of alkyl acrylates, alkyl acrylics, alkyl methacrylates, hydroxyalkyl acrylates, hydroxyalkyl methacrylates and mixtures thereof.

31. Chemical treating composition of claim 29 wherein the polyurethane and the copolymer are present in oil-in-water emulsions or dispersions in the chemical treating composition.

32. Chemical treating composition of claim 29 having an antistat.

33. Chemical treating composition of claim 29 having an epoxy-containing polyester processing aid.

34. High modulus fibers selected from the group consisting of carbon fibers, polyaramide fibers and glass fibers having at least a portion of their surfaces treated with the dried residue of a chemical treating composition of claim 29.

35. Chemical treating composition for application to reinforcing materials for polymers to form a thin film on the reinforcing materials to enhance reinforcing properties in the reinforced polymers, comprising:

a. at least one crosslinkable, thermoplastic high molecular weight aliphatic elastomeric polyurethane film forming polymer in an effective film forming amount, b. at least one organofunctional silane coupling agent or its hydrolysis products in an effective coupling agent amount, c. a copolymer of at least one addition polymerizable acrylic monomer and at least one monomer that is addition polymerizable and matrix-resin-miscible and matrix-resin-reactable, selected from the group consisting of addition polymerizable epoxy-containing monomer and nitrile-containing monomer selected from acrylonitrile, methacrylonitrile and $C_2$–$C_4$ nitrile-containing groups, wherein the ratio of the acrylic monomer to the nitrile-containing monomer is 75:25 and wherein the copolymer is present in an effective film forming amount for solvent resistance, and d. a carrier in an effective application amount for treating the reinforcement with the chemical treating composition.

36. Chemical treating composition of claim 35, wherein the epoxy-containing monomer is selected from the group consisting of glycidyl acrylate and glycidyl methacrylate.

37. An aqueous chemical treating composition for application to reinforcing materials for polymers to form a thin film on the reinforcing materials to enhance reinforcing properties in the reinforcing polymers, comprising:

a. at least one crosslinkable polyurethane film forming polymer oil-in-water emulsion or dispersion in an effective film forming amount, b. at least one organofunctional silane coupling agent selected from the group consisting of amino organofunctional silanes and its hydrolysis products in an effective coupling agent amount, c. a self crosslinking copolymer of at least one addition polymerizable acrylic monomer and at least one matrix-resin miscible and reactable monomer which is selected from the group consisting of addition polymerizable epoxy-containing monomer and nitrile-containing monomer selected from the group consisting of: acrylonitrile, methacrylonitrile, and $C_2$–$C_4$ nitrile-containing groups, wherein the copolymer is present in an oil-in-water emulsion or dispersion in an effective film forming amount, and wherein the ratio of the crosslinkable polyurethane film forming polymer to the copolymer ranges from 1:10 to 10:1 and the amount of the copolymer is in the range of about 5 to about 20 weight percent of the solids;

d. metal deactivator selected from the group consisting of: polydentate ligands and compounds having the formula:

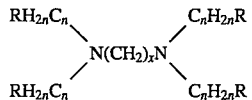

wherein x is an integer with a value from 1 to about 6, and wherein n is an integer with a value from 1 to about 6 and R is a carboxylic acid group, hydroxyl group, carboxylic acid alkyl ester group or sodium, potassium or ammonium salts of carboxylic acid present in an effective metal chelating amount;

e. crosslinking agent for the polyurethane that is selected from the group consisting of: blocked aliphatic polyisocyanates and its adducts containing biruret or allophanate groups, wherein the blocking agent is selected from the group consisting of secondary alcohols, tertiary alcohols and C—H acid compounds and where the weight ratio of the crosslinking agent to the polyurethane resin ranges from 1:20 to 20:1;

f. at least one antioxidant effective at higher temperatures selected from the group consisting of alkali metal phenyl phosphonates, alkaline earth metal phenyl phosphonates, thioethers, polymers of thioethers and mixtures thereof in an effective antioxidant amount;

g. at least one low temperature antioxidant selected from the group consisting of halogenated hydroxyl ammonium compound, hydrosulfite, bisulfite, phosphorous, phosphite and phosphite-containing reducing agent selected from the group consisting of metal hypophosphites, and ammonium hyposphosphite in an effective antioxidating amount.

38. High modulus fibers selected from the group consisting of carbon fibers, polyaramide fibers and glass fibers having at least a portion of their surfaces treated with the dried residue of a chemical treating composition of claim 37.

* * * * *